United States Patent [19]

Dickinson et al.

[11] Patent Number: 4,588,312
[45] Date of Patent: May 13, 1986

[54] ANTIFRICTION BEARING WITH REMOVABLE THERMALLY EXPANDABLE AND CONTRACTABLE SEAL MEANS

[75] Inventors: Thorn W. Dickinson, Berlin, Conn.; Gilbert W. Geiger, deceased, late of Southington, Conn., by Dolores A. Geiger, executrix

[73] Assignee: Fafnir Bearing - Division of The Torrington Company, New Britain, Conn.

[21] Appl. No.: 724,626

[22] Filed: Apr. 18, 1985

[51] Int. Cl.$^4$ .................. F16C 33/76; F16C 19/52
[52] U.S. Cl. .................. 384/482; 384/484; 384/905
[58] Field of Search .......... 384/477, 479, 481, 482, 384/484–488, 493, 905; 277/212 F, 94, 95

[56] References Cited

U.S. PATENT DOCUMENTS

| | | | |
|---|---|---|---|
| 3,276,826 | 10/1966 | Draudt | 384/482 |
| 3,709,572 | 1/1973 | Pethis | 384/482 |
| 3,994,545 | 11/1976 | Van Dorn | 384/482 |
| 4,333,694 | 6/1982 | Howe, Jr. | 384/482 |

FOREIGN PATENT DOCUMENTS 613990  2/1961  Canada .................. 384/484

Primary Examiner—Stuart S. Levy
Assistant Examiner—Thomas R. Hannon
Attorney, Agent, or Firm—Hayes & Reinsmith

[57] ABSTRACT

An antifriction bearing having inner and outer race rings and a seal ring featuring a multiplicity of resilient seal ring retaining projections for compressive wedging engagement within a retaining groove of the outer bearing ring.

12 Claims, 6 Drawing Figures

ANTIFRICTION BEARING WITH REMOVABLE THERMALLY EXPANDABLE AND CONTRACTABLE SEAL MEANS

BACKGROUND OF THE INVENTION

This invention relates to antifriction bearings and more particularly concerns an improved removable seal ring for use between relatively rotating parts such as inner and outer rings of an antifriction bearing.

Several attempts have been made to simplify the seals of bearing units and reduce the overall costs involved. One such attempt provides a seal construction having three component members for insertion into a seal retaining groove of inner and outer bearing members. The seal members comprise a stiff annular backing ring, and a stiff removable split ring, with a yieldable annular seal ring compressed between the stiff rings for wiping contact with an inner bearing ring. Such a seal is disclosed in Howe U.S. Pat. No. 4,333,694 issued June 8, 1982 and assigned to the assignee of this application.

Another seal of the general type to which this invention pertains is shown in Van Dorn U.S. Pat. No. 3,944,545 issued Nov. 30, 1976 and assigned to the assignee of this application. The Van Dorn patent discloses a two-piece end seal cap for an antifriction bearing wherein an annular elastomeric seal member of yieldable material is bonded to a formed-metal member. The seal member is in sealing contact with an inner ring cylindrical land, and the formed-metal member has a deformable outer mounting means insertable into an outer ring groove.

While such seals as those specifically noted above have performed well for retaining bearing lubricants and for protecting against entry of contaminants, their construction incorporates different individual members in a composite seal assembly with concomitant manufacturing costs.

BRIEF STATEMENT OF THE INVENTION

Accordingly, it is an object of this invention to provide an improved bearing seal ring of significantly simplified construction, particularly suited for low cost production, for retention of bearing lubricant and for protection against entry of contaminants.

Another object of this invention is to provide an improved bearing seal ring compatible with mass production techniques while providing a seal ring for extended life under high speed and/or extreme temperature operating conditions.

Still another object of this invention is to provide a bearing seal ring exhibiting thermal expansion and contraction characteristics and requisite resilience to accommodate and compensate for any undesired seal ring end play and misalignment within a bearing ring retaining groove thereby to maintain seal effectiveness.

Still another object of this invention is to provide such a bearing seal ring of inherently low cost construction which permits more simple and effective ring seal disassembly and re-assembly for inspection and maintenance of the bearing.

Other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the various ways in which the principles of the invention are employed.

BRIEF SUMMARY OF THE INVENTION

The invention achieves the foregoing objects by providing a bearing seal ring having a multiplicity of resilient retaining projections extending from an annular rim for compression within a retaining groove of an outer ring of a bearing to provide for positive seals to be maintained against the seal surfaces of the inner and outer race rings.

BRIEF DESCRIPTION OF THE DRAWINGS

Preferred embodiments of this invention will be described in detail in conjunction with the accompanying drawings, in which.

DETAILED DESCRIPTION OF THE PREFERRED EMBODIMENTS

Figure 1:
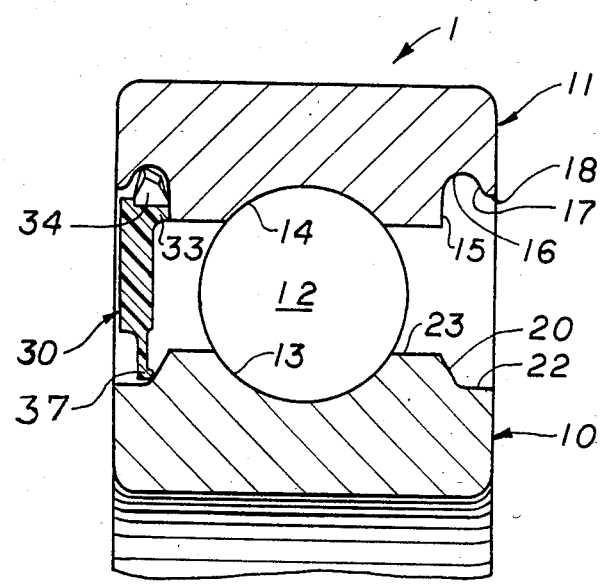
FIG. 1 is a view, partly broken away and partly in cross section, of an antifriction bearing and bearing seal ring construction of this invention.

Antifriction bearing 1 of FIG. 1 comprises steel or other hardened alloy rings, such as inner ring 10 and an outer ring 11, with interposed antifriction elements in the form of balls 12 riding respective raceways 13 and 14 of rings 10 and 11. A one piece injection molded plastic retainer (not shown) with ball retaining fingers may be used to hold a complement of balls such as at 12 in angularly spaced relation within raceways 13 and 14. Both axial ends of the bearing 1 may be closed and sealed by a cap structure or seal ring 30 of this invention.

As shown in FIG. 1, seal ring 30 is secured in a mounting recess defined by radial shoulder portion 15 and continuously curved contour groove 16 of outer ring 11. The groove 16 terminates via a ramp 17 merging with a land 18 at an axial end of outer ring 11. In the bearing 1 as shown, ramp 17 is defined by a reverse curvature of the predominant curve of groove 16 and that reverse curvature continues into tangency with land 18. Shoulder 15 provides a surface for sealing contact with face 33 of seal ring 30.

Axial ends of inner bearing ring 10 are rabbeted to define an axially extensive sloping seal surface 20 bounded by a crylindrical land 22 and a shoulder 23 concentric to land 22. It is preferred that seal surface 20 be inclined at an angle of about 60° with respect to shoulder 23 of inner bearing ring 10.

Seal ring 30 is insertable into circumferential retaining groove 16 and compressed by bearing outer ring 11 such that the sealing faces 37 and 33 of ring 30 are, respectively, in circumferentially continuous and axially extensive sealing contact with sloping seal surface 20 of inner ring 10 and in circumferentially continuous sealing contact with radial shoulder 15 of outer ring 11.

More specifically, and in accordance with this invention, the one-piece seal ring 30 is preferably formed in its entirety of thermoplastic or thermo-set materials or other similar resilient, wear and contaminant-resistant plastic materials. Such materials may also include fibers of carbon, "Kevlar" and glass, for example, as strength enhancing components. These materials and the following described structure of a seal ring construction of this invention eliminate any need whatsoever for commonly encountered metal inserts of prior art seals and accordingly lend this seal ring 30 to facile manufacture by a suitable quick and easy molding operation, such as by injection molding.

Figure 2:
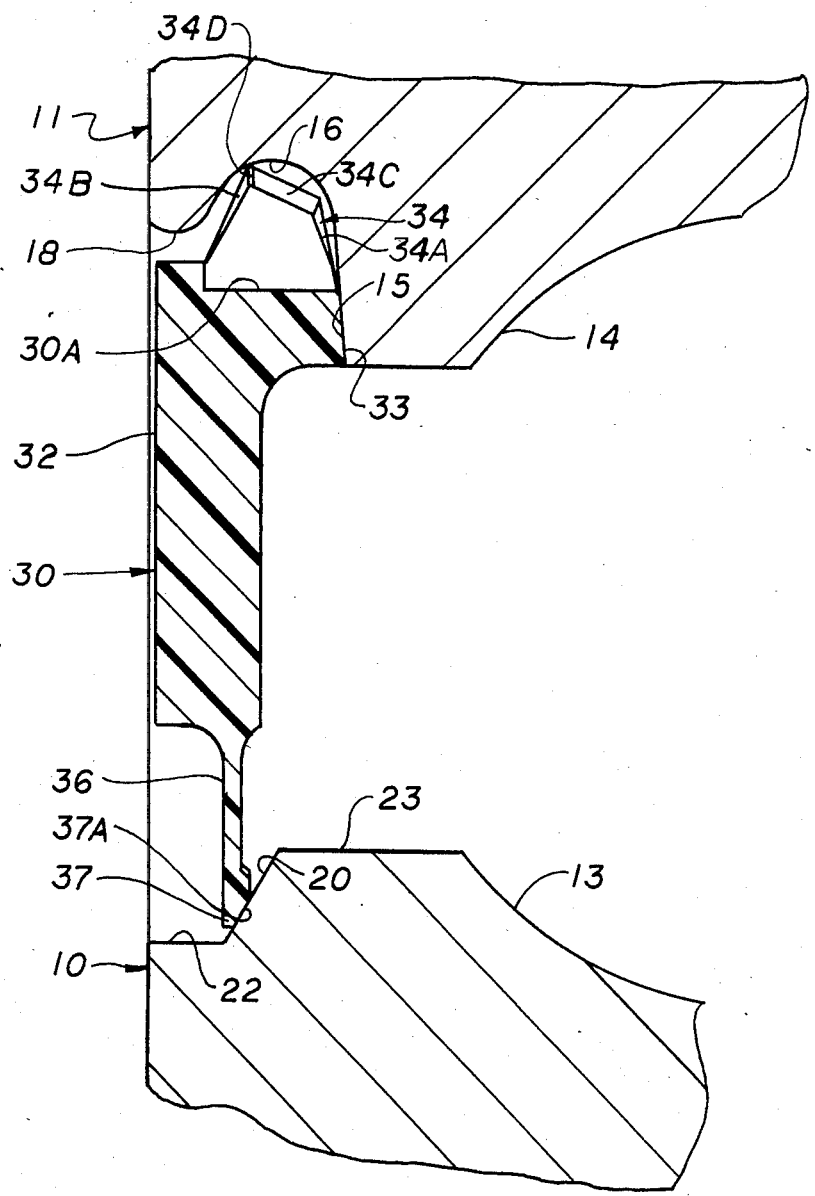
FIG. 2 is an enlarged fragmentary view, partly in cross section, of the seal ring of FIG. 1.
Figure 3:
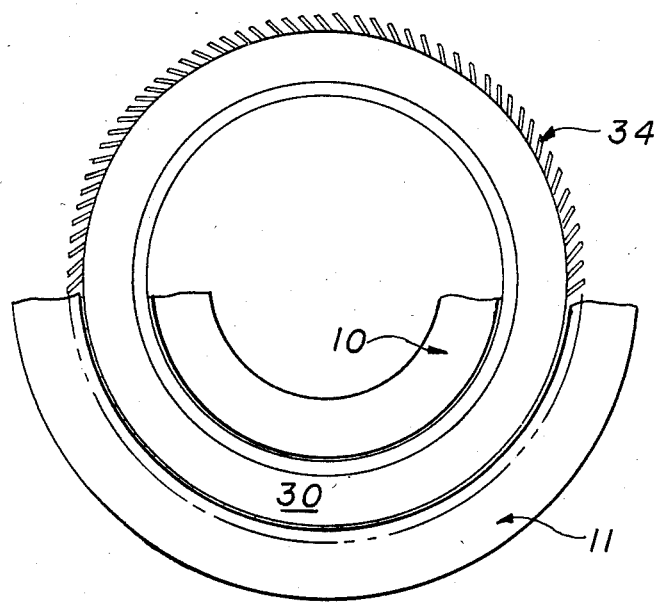
FIG. 3 is an end view, partly broken away, of an antifriction bearing and seal ring assembly of FIG. 1.

As best seen in FIGS. 2 and 3, seal ring 30 has an annular central body portion 32 of generally rectangular cross section. Body portion 32 has an integral skirt 36 of reduced thickness terminating adjacent an inside diameter of seal ring 30 in a pad 37 having an annular face 37A for resiliently-loaded, wiping contact with sloping seal surface 20 of inner bearing ring 10. Body portion 32 has an axially protruding boss defining a face 33 for sealing contact with radial shoulder 15 of outer ring 11. To maintain the above described positive sealing contact with sealing surfaces 20 and 15 of inner and outer race rings 10 and 11, respectively, a multiplicity of ring retaining fingers or projections 34 are provided on the outer rim of seal ring 30 in accordance with this invention.

These projections 34 each extend outwardly from body portion 32, preferably at an angle to a radial line segment extending from a center of seal ring 30, such that when seal ring 30 expands, e.g., under high temperature conditions, the projections 34, which engage outer race ring 11 surrounding groove 16, bend and compress radially inwardly toward annular body portion 32 without exceeding the yield point and thereby compensate for the effects of such thermal expansion. A preferred projection angle is about 45° from body portion 32, but because of the inherent flexibility of the disclosed structure, it will be appreciated that it is possible to vary the angle of the projections 34 in accordance with the application of the bearing or any special conditions under which it may operate. Projections 34 are also preferably placed approximately 4° apart from each other on the circumference of body portion 32 in the disclosed embodiment of FIGS. 1-3.

Upon assembly, projections 34 of seal ring 30 are slipped under land 18 into groove 16. To ensure compression of projections 34 by outer ring 11, the maximum outer diameter of seal ring 30 as defined collectively by projections 34, is greater than the diameter of groove 16, thereby holding seal ring 30 securely in place and resiliently loading seal ring face 37A to provide wiping contact with sloping seal surface 20 of inner ring 10 to positively ensure a more effective seal between inner and outer rings 10 and 11. It is to be understood that projections 34 may flex within groove 16 during normal operating conditions without affecting the performance of seal ring 30.

In accordance with another feature of this invention, each retaining projection 34 is an individual multifaceted member dimensioned and configured to allow easy insertion upon assembly under land 18 and into groove 16. More specifically, and with particular reference to FIG. 2, each projection 34 is shown having flat inside and outside shoulders 34A and 34B (extending radially outwardly from the rim 30A of seal ring 30). These shoulders 34A and 34B extend outwardly from rim 30A toward one another in opposite angular directions. Inside shoulder 34A is shown intersecting a plane containing a flat ramp 34C. The latter extends both radially and axially outwardly from shoulder 34A to terminate in a tip 34D defined by an intersection between ramp 34C and outside shoulder 34B.

By virtue of the disclosed construction, inside shoulder 34A and ramp 34C cooperate to promote the ability of each projection finger 34 to quickly and easily slide under land 18. Tip 34D forms an outer compression surface at the intersection of ramp 34C and outside shoulder 34B and is compressively wedged within groove 16 in fixed relationship with outer ring 11.

While this invention has been described in detail for a preferred form, it will be understood that modifications may be made without departure from the claimed invention. For example, FIGS. 4–6 each illustrate different embodiments. Throughout these different embodiments, it is to be understood that the dimensioning and configuration of the projections as shown are generally the same or similar to those of the projections illustrated in the embodiments described below.

Figure 4:
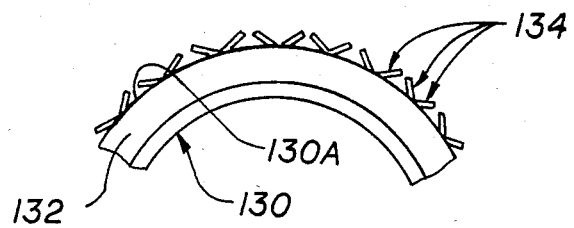
FIG. 4 is a fragmentary profile of a different embodiment of a seal ring of this invention.

FIG. 4 represents a second embodiment of a seal ring 130 in accordance with the invention, wherein projections 134 each extend outwardly from rim 130A of ring 130 in an angular direction opposite that of the adjacent projections. Each projection 134 terminates in an outer free end.

Figure 5:
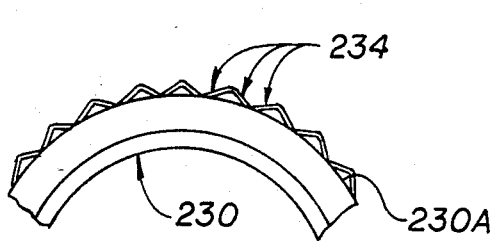
FIG. 5 is a fragmentary profile of another embodiment of a seal ring of this invention.

Seal ring 230 of FIG. 5 is provided with adjacent projections 234 each extending outwardly from rim 230A of ring 230 in an angular direction opposite that of the adjacent projections. Adjacent projections are shown merging with one another at their respective inner and outer terminal ends to define hollow triangular forms, in profile. The hollow triangular form of these projections facilitate compression against the outer ring, not shown, when inserted within its retaining groove.

Figure 6:
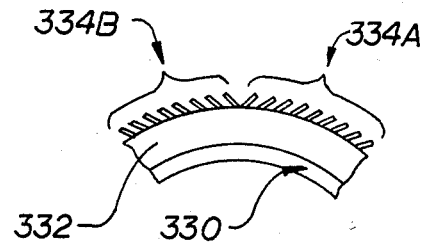
FIG. 6 is a fragmentary profile similar to that of FIGS. 4 and 5 illustrating yet another embodiment of this invention.

FIG. 6 represents still another embodiment of a seal ring 330. In this seal ring 330, projections are formed in at least two adjacent groups shown collectively at 334A and 334B, extending about the circumference of annular body portion 332. The individual projections of each group protrude in a common angular direction, with adjacent groups having their projections extending in opposite angular directions relative to a radial line segment extending from the center of the seal ring 330.

The present invention features an effective one-piece seal ring in which the described seal ring faces provide positive and circumferentially continuous sealing faces against sealing surfaces of outer and inner bearing rings. The special form, shape and arrangement of the disclosed projections enable the seal ring to accommodate greater thermal expansion and contraction during operating conditions and to maintain effective seals with bearing rings during extreme high and low temperature operations.

Accordingly, exceptionally accurate tolerances need not be demanded during manufacture of the seal rings of this invention, since variations in the outer diameter of the projections will not prevent proper sealing operation.

As will be apparent to persons skilled in the art, various modifications, adaptations and variations of the foregoing specific disclosure can be made without departing from the teachings of this invention.

We claim:

1. A sealed antifriction bearing comprising inner and outer race rings with interposed antifriction elements riding the races of the rings, the outer ring having a circumferentially continuous groove, the inner ring having a seal surface in substantially axial registry with the outer ring groove, and a one-piece seal ring having an inner sealing face in positive wiping contact with the inner ring seal surface, the one-piece seal ring having a multiplicity of outwardly protruding resilient projections each terminating in a free end, the free ends of the projections in an unstressed condition, collectively defining an outside seal ring diameter greater than the maximum diameter of the outer ring groove, the seal ring projections being deflectable substantially in the plane of the seal ring with the free ends of the projections being continuously retained in compressively wedged engagement within the outer ring groove, whereby the outer ring circumferentially compresses the seal ring such that its inner sealing face continuously applies an axially inwardly directed thrust upon the seal surface of the inner ring and the assembly provides for seal ring expansion and contraction while maintaining a sealed bearing of high integrity.

2. The bearing of claim 1 wherein the seal ring is formed of thermoplastic material.

3. The bearing of claim 1 wherein the seal ring is formed of thermoset material.

4. The bearing of claim 1 in which the material of the seal ring includes strength enhancing components.

5. The bearing of claim 1 wherein the projections are tapered generally outwardly from the center of the seal ring for axial insertion into the outer ring groove, wherein the projections serve to provide a firm but flexible connection to the outer ring, and wherein the seal ring is readily axially removable from the inner and outer race rings.

6. The bearing of claim 1 wherein adjacent projections of the seal ring extend outwardly in a common angular direction offset from a radial line extending from the center of the seal ring.

7. The bearing of claim 1 wherein adjacent projections of the seal ring extend outwardly in opposite angular directions relative to a radial line extending from the center of the seal ring.

8. The bearing of claim 1 wherein the seal ring includes adjacent groups of projections circumferentially formed about the ring and respectively extending in opposite angular directions relative to a radial line extending from the center of the seal ring, each group including a plurality of individual projections protruding outwardly in a common angular direction.

9. The bearing of claim 1 wherein adjacent projections extend outwardly in opposite angular directions relative to a radial line extending from the center of the seal ring, and wherein the terminal ends of each projection are each joined to a terminal end of an adjacent projection to form a seal ring having a continuous series of compressible peripheral members.

10. The bearing of claim 1 wherein said seal surface of the inner ring comprises a sloping seal surface in substantially axial registry with said groove, and wherein the seal ring is formed of plastics material having a form sustaining rigidity, the plastics material also having a higher rate of thermal expansion than that of the inner and outer race rings.

11. The bearing of claim 10 wherein the seal ring includes an annular central body portion having circumferentially continuous sealing faces at opposed inner and outer radial ends thereof for engagement with said sloping seal surface of the inner ring and with the outer ring, respectively, and wherein the projections integrally extend outwardly from the central body portion for wedging engagement with the outer ring within its groove.

12. The bearing of claim 11 wherein the seal ring includes a skirt of reduced thickness extending radially inwardly from said central body portion, and a circumferentially continuous pad integrally formed with the skirt and forming said inner sealing face for engagement with the sloping seal surface of the inner ring, and wherein the seal ring further includes an axially inwardly extending annular boss adjacent said projections and forming a second circumferentially continuous sealing face for sealing contact with the outer ring.

* * * * *

UNITED STATES PATENT AND TRADEMARK OFFICE
CERTIFICATE OF CORRECTION

PATENT NO. : 4,588,312
DATED : May 13, 1986
INVENTOR(S) : Thorn W. Dickinson, Gilbert W. Geiger It is certified that error appears in the above—identified patent and that said Letters Patent is hereby corrected as shown below:

Column 1, line 24, wherein the number "3,944,545" should be --3,994,545--.

Column 5, line 11, wherein "," should be deleted.

Signed and Sealed this

Twenty-sixth Day of August 1986

[SEAL]

Attest:

Attesting Officer

DONALD J. QUIGG

Commissioner of Patents and Trademarks